United States Patent

[11] 3,560,754

[72] Inventor Louis A. Kamentsky
 Briarcliff Manor, N.Y.
[21] Appl. No. 508,307
[22] Filed Nov. 17, 1965
[45] Patented Feb. 2, 1971
[73] Assignee International Business Machines
 Corporation
 Armonk, N.Y.
 a corporation of New York

[54] PHOTOELECTRIC PARTICLE SEPARATOR USING TIME DELAY
19 Claims, 2 Drawing Figs.

[52] U.S. Cl. .................................................. 250/218,
 209/111.5, 324/71, 356/39
[51] Int. Cl. .................................................. G01n 21/26
[50] Field of Search ........................................ 250/218;
 209/111.5, 74; 88/14SF; 210/130; 324/71; 356/39,
 102

[56] References Cited
UNITED STATES PATENTS

| | | | |
|---|---|---|---|
| 3,052,353 | 9/1962 | Pritchett ............... | 250/83.3 |
| 3,161,589 | 12/1964 | Burckhalter ........... | 210/130 |
| 3,320,428 | 5/1967 | Wagstaffe et al. ..... | 250/218 |
| 2,387,952 | 10/1945 | Smith .................... | 209/74 |
| 2,417,877 | 3/1947 | Lewis .................... | 250/218 |

Primary Examiner—Archie R. Borchelt
Assistant Examiner—Martin Abramson
Attorneys—Hanifin and Jancin and Thomas J. Kilgannon, Jr.

ABSTRACT: This disclosure relates to apparatus for discriminating between cancer and normal cells by measuring the absorption by nucleic acids per unit volume of each cell in a sample and separating the cancer cells from the sample by shunting the cancer cells from a main flow channel into a shunting junction. Upon being presented at the junction, after a suitable delay, a force is applied at the junction to the cancer cell and the cell is passed into the shunting junction for subsequent collection. The force applied to the cell may be hydraulic, pneumatic, electrostatic or some combination of these forces.

PHOTOELECTRIC PARTICLE SEPARATOR USING TIME DELAY

One of the major problems confronting the medical profession is the detection of incipient disease in large groups of people. As population increases, the need for mass screening techniques for disease detection becomes a necessity. Instrumentation for analysis and detection is gradually being provided by the medical profession and by industry so that, for certain types of disease, it is possible to sample a fairly large segment of the population. By and large, though, the tests and analyses provided are of the type which provide a "yes" or "no" answer. Where fine distinctions must be made in analyzing the results of a test or where information from a sample is subject to interpretation, intervention by a pathologist or other medical person is required to confirm the tests. In many instances, the study to make a confirmation of a suspect test is the most time-consuming part of the analysis. This is particularly so in cases where a pathologist is attempting to confirm the presence of cancer cells in a cervical smear, for instance. In the early stages of cancer, the small number of cancer cells present in a sample alone is sufficient to make confirmation of their presence difficult and time consuming. In view of the hope that it may be possible to detect incipient cancer by refined analytical techniques, confirmation of its presence can be expected to be even more difficult in the future because even fewer cells having abnormalities would be present in such circumstances. One solution to the screening of samples of this nature would be to present the pathologist with only that portion of the sample which is needed to make a determination. Thus, in the case of abnormal cells in a sample being checked for the presence of cancer, only the abnormal cells need be checked to make a positive determination. The greater part of the sample composed of normal cells could, therefore, be eliminated without affecting the validity of the pathologist's findings.

In other areas involving the study of blood and other body fluids, it is often necessary to separate one sort of cell from another for study purposes. Present techniques often damage the cells by mechanical action or cause environmental changes which affect the results. It is apparent from the foregoing, that a need exists for apparatus which is able to provide an investigator with that portion of the sample which will permit him to provide an accurate determination in the shortest possible time or to obtain selected constituents of a sample without damage to the constituents or change in their environment.

It is, therefore, an object of this invention to provide apparatus which will selectively separate the components or constituents of a biological sample according to type or condition.

Another object is to provide separation apparatus which is an improvement over prior art apparatus such as centrifugation apparatus, precipitation arrangement and the like.

Another object is to provide separation apparatus which is fast, accurate and amenable to use in the mass screening area.

Still another object is to provide separation apparatus which maintains the desired portion of the sample within an environment which does not subject the sample to damage or changes in characteristics.

In accordance with this invention, apparatus is provided for separating a desired portion of a biological sample according to type or condition from a sample containing a plurality of discrete particles which includes means for transporting the discrete bodies of the sample serially along a given path. In this instance, where the particles or discrete bodies are extremely small, (biological cells, for example) the transporting means may consist of a tube having a constriction therein, or may be a capillary tube or a capillary groove cut in a glass plate closed with a cover slip or the like. The bore of such constriction, capillary tube or groove is only slightly larger than the diameter of the particles being transported. Once the discrete particles are aligned in serial fashion, each particle is separately sensed according to some characteristic such as absorption of discrete light wavelengths, resistivity, volume, area or the like. A threshold value or change of the characteristic or characteristics chosen provides for the selection of a desired particle. An output signal from the sensing apparatus, after an appropriate delay, actuates separation means which separate the particles from the given path. The separation means may utilize pneumatic, hydraulic or electrostatic techniques or combinations of these techniques. In the embodiments to be described in the following description, the pneumatic-hydraulic techniques are used to advantage. Specifically, the sample to be separated is passed through a capillary tube. At some point along the capillary tube, the particles are sensed according to a desired characteristic by optical or other suitable sensing means. The sensed particles, at some point further along the capillary tube are diverted into an intersecting channel, either by applying a vacuum, higher pressure of air or by the closing and opening of valves which halt the flow of fluid in the capillary and cause the fluid carrier to flow in the intersecting channel thereby removing the desired particle from the sample.

Alternatively, the capillary tube may be open to the atmosphere such that, droplets holding a desired particle are formed due to a combination of suction and surface tension or vibration and surface tension. All undesired particles are channelled into a tube to which air suction is applied. Another capillary tube which is made of conductive material such as steel also has suction applied to it. This suction is, however, insufficient to affect the passage of the droplets to the first mentioned tube. The droplets are caused to enter the second mentioned tube in response to a signal from a sensing means. This signal, having sufficient voltage to create an electrostatic field, is applied to the above mentioned steel tube such that the combination of electrostatic force and suction attract a desired particle into the channel to which the electrical pulse is applied. The above arrangements permit the separation of cancer cells from normal cells and, in addition, are capable of separating the different types of cells such as leukocytes, red cells and lymphocytes which are normally present in blood, for example.

In yet another embodiment, using the last mentioned arrangement, the undesired cells may be channelled into a given tube by suction alone. Thus, instead of applying an electrical pulse to the steel tube, more suction may be applied to overcome the suction from the other tube such that a desired cell is channelled to a collection point. The sudden increase in suction may be provided by an actuable pinch roller or the like which would suddenly, in response to an actuating signal, remove a constriction in tubing associated with a particular channel.

The foregoing, and other objects, features, and advantages of the invention will be apparent from the following more particular description of a preferred embodiment of the invention, as illustrated in the accompanying drawings:

Figure 1:
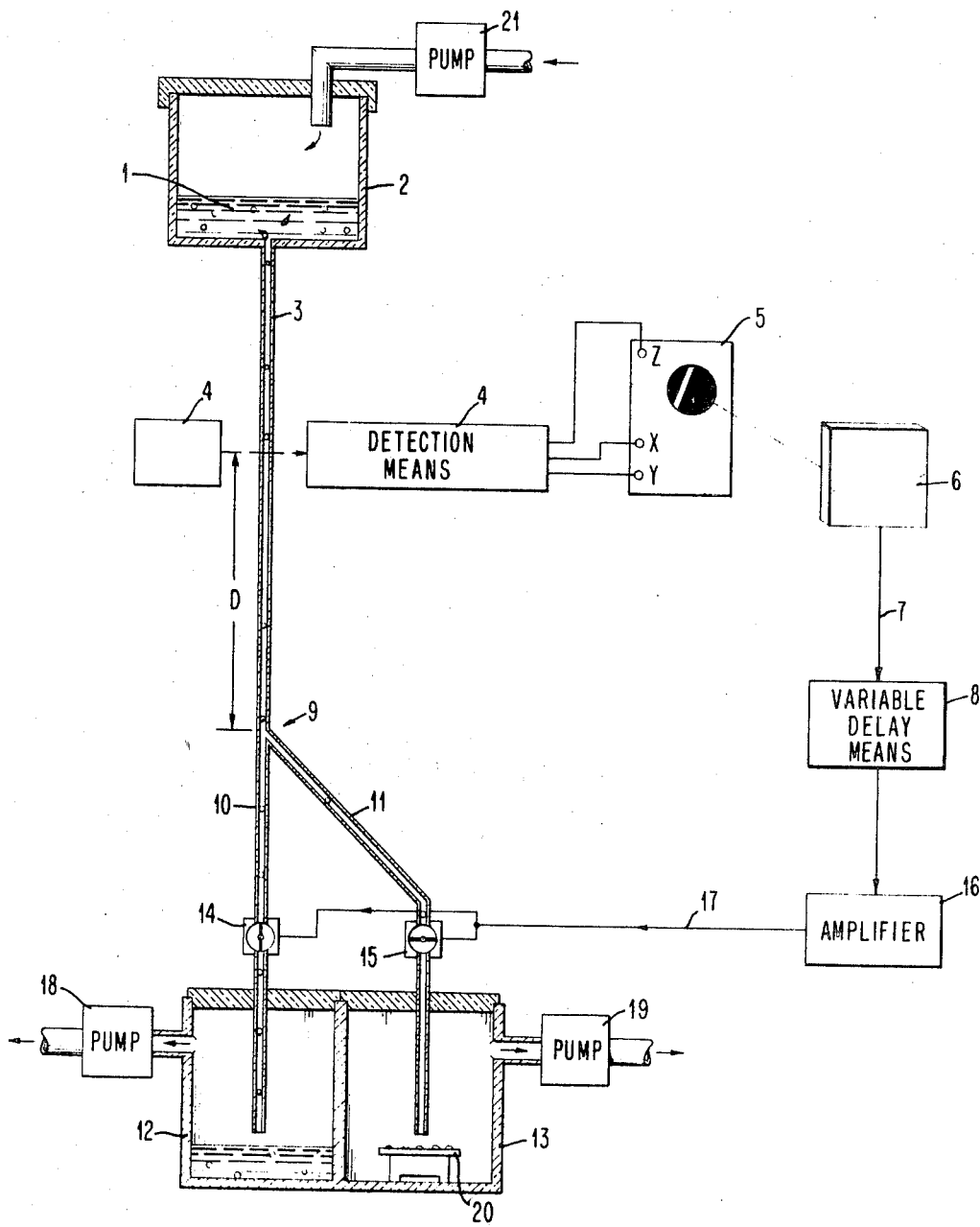
FIG. 1 is a preferred embodiment of a cell separation system shown in partial block diagram form which utilizes a channel intersecting a capillary tube to remove desired particles from a fluid by actuating appropriately located valves to permit flow in an intersecting channel while halting the flow in a capillary tube.

Referring now to FIG. 1, there is shown apparatus for separating particles having a desired characteristic or characteristics from a sample which contains the desired particles, among others. In what follows, the sample from which desired particles are to be separated will be characterized as a biological fluid sample from which cells having given characteristics are to be removed. This characterization is made only by way of example and for the sake of clarity and is not intended to be a limitation on the scope of this invention.

A biological fluid sample 1 containing cellular bodies or particles is shown disposed in closed container 2 in FIG. 1. Sample 1 may be a sample obtained from the human cervix in a well-known manner which, if it contains abnormal cells, may indicate the presence of cancer in the cervix or uterus. Capillary tube 3 extends from container 2 past detection means 4 which is adapted to detect a desired characteristic in accordance with which a selection or separation of cells will ultimately be made. One such desired characteristic is the amount of nucleic acid (DNA and/or RNA) present in a cell per unit volume. Experiments have indicated that the presence of large amounts of nucleic acid per unit of cell volume is an abnormality which may be indicative of the presence of cancer. Nucleic acids are absorptive of ultraviolet light in the region of 2,537 A and detection apparatus based on the phenomenon in conjunction with a light scattering arrangement has been disclosed in a copending application Ser. No. 451,947 entitled "Method and Apparatus for High Speed Measurements on Biological Cells" in the name of L. A. Kamentsky and assigned to the same assignee as the present application. The detection apparatus of the copending application can be substituted in whole or in part in block 4 of FIG. 1 and, briefly, operates in the following manner. A cell, for instance, is illuminated by a broad band ultraviolet light source which in conjunction with the optics of a microscope and a dichroic mirror pass the transmitted light to two photomultiplier tubes. The dichroic mirror passes wavelengths greater than 4,000 A and reflects at 90° shorter wavelengths. A filter interposed in the path of the reflected beam along with a photomultiplier tube of appropriate type effectively isolate the 2,537 A wavelength. In this manner, the absorption by the cell at 2,537 A can be measured and an output pulse the amplitude of which is proportional to the absorption is obtained. The other photomultiplier measures the loss due to light scattering by the cell which is directly proportional to the volume of the cell and results in an output pulse the amplitude of which is proportional to the light loss by scattering. The two output pulses after appropriate amplification are applied to the horizontal and vertical axes of an oscilloscope to provide a display indicative of the absorption per unit volume of the cell being tested. To provide an indication of the absorption per unit volume of a cell as a single spot of light on the scope face, a differentiating circuit is utilized to differentiate the absorption pulse. The zero crossing of this signal actuates a pulser which provides a 1 microsecond duration pulse to the Z-axis or intensity modulating terminal of the oscilloscope. In this manner, the absorption per unit volume of each cell appears on the scope as a point of light. Since only those cells having a high absorption per unit volume are of interest, signals resulting from such cells can be isolated and utilized to actuate a means for selecting the associated cells.

Returning now to FIG. 1, there is shown an oscilloscope 5 actuated by leads from detection means 4 at its X, Y, Z terminals as described hereinabove. The tube face of oscilloscope 5 is masked to show only signals resulting from cells having a desired absorption per unit volume. A photocell shown schematically at 6 is placed over the face of the tube. Thus, when a spot of light appears on the scope face, the photocell is activated and an output signal is provided on lead 7. The output signal is then introduced into delay means 8 where a delay equal to the difference in time required for the cell to pass down the capillary tube from the detection point to the removal point and the actuation time of any valves utilized is provided.

Once the characteristics of a cell have been examined, the cell passes along capillary 3 for a given distance D to a shunting junction 9. The distance D, the velocity of the carrier fluid, and the time required for valves to operate determine the amount of delay which must be introduced by delay means 8 so that a given cell may be removed from capillary tube 3 at junction 9. Delay means 8 is shown as a variable delay to permit variations in flow rate as required. Junction 9 consists of a continuation 10 of capillary tube 3 and an intersecting tube 11. Continuation 10 and intersecting tube 11 terminate in sealed containers 12, 13 respectively, which collect the undesired cells and the desired cells, respectively. Actuable valves 14, 15 are interposed in continuation 10 and intersecting tube 11, respectively. Actuable valve 14 is normally open while valve 15 is normally closed. These valves may be any suitable type of mechanically or electrically actuable valves well known to those skilled in the valve art. In FIG. 1, valves 14 and 15 are electrically actuated by solenoids (not shown). The operating cycle time of these valves must be taken into consideration when determining the amount of delay provided by delay means 8.

Valves 14, 15 are actuated in parallel by a signal along conductor 17 from amplifier 16 which amplifies the signal received from delay means 8. Vacuum pumps 18, 19 are connected to containers 12, 13 respectively, to apply suction to continuation 10 and intersecting tube 11, respectively. Thus, suction is applied through normally open valve 14 at all times except when a signal on scope 5 activates photocell 6. This signal, after an appropriate delay and amplification simultaneously closes normally open valve 14 and opens normally closed valve 15. A desired cell is presented at junction 9 at the same instant and, in response to suction through closed container 13 from pump 19 and now opened valve 15, the cell enters intersecting tube 11 and is carried to a slide 20 where the desired cells are collected. To provide for constant flow rates in capillary tube 3 and to force sample 1 through tube 3, a pump 21 provides positive pressure in container 2. The arrangement of FIG. 1 is not limited to a detection of a single characteristic or to a single junction having only one intersecting channel. A plurality of junctions 9, can be disposed along the length of capillary tube 3 and a plurality of intersecting channels 11 in conjunction with valves disposed in channel 11 can be adapted to respond to different characteristics of the particles or bodies introduced into the capillary. As has been indicated hereinabove, different characteristics can be utilized to provide for separation according to that characteristic. For example, using the detection arrangement of the copending application mentioned hereinabove, different values of voltages are applied to the X and Y terminals of oscilloscope 5 depending upon the absorption and scattering of the cell or body being investigated. Thus, different ratios of Y/X can be provided which can be selected by a plurality of appropriately biased amplifiers. The output signals from these amplifiers in turn can actuate valves, after appropriate delays, in intersecting channels which are adapted to collect the cell associated with the actuating signal.

The cell separation described hereinabove, can be accomplished using a single valve, instead of two as shown in FIG. 1. A sample 1, may be directly infused into capillary 3 by a hypodermic syringe or the like at a constant rate with pump 18 turned off. The system would act in the same manner as described above, except that valve 14 can be eliminated. When the energizing signal opens valve 15, the low pressure in container 13 preferentially shunts the desired cell into intersecting tube 11 through valve 15 to collecting slide 20.

The sensing of a signal indicating the presence of a desired cell has been shown in FIG. 1 as an oscilloscope-photocell combination but it should be clear that a signal could be obtained directly from detection means 4 which, after an appropriate delay, would actuate valves 14, 15, for example, the X and Y outputs from detection means 4 could be separately amplified in logarithmic amplifiers and applied as a ratio device which provides an output proportional to the ration Y/X. A threshold device, appropriately biased, would then pass signals which exceeded a given ratio.

It should be appreciated that the cell separation apparatus of FIG. 1 particularly the capillary and junction arrangements have been exaggerated in size for purposes of clarity and description. In a working model, capillary tube or channel 3 has an inside diameter of approximately 4 mils. The distance D is approximately 50 mils which at a nominal flow rate of 0.5 cc./min. requires a delay which is the difference between the time required to travel distance D (1 millisecond) and the time required for valves 14, 15 to open completely (0.5 millisecond). Valves 14, 15 have a cycle time of 1.5 milliseconds.

Figure 2:
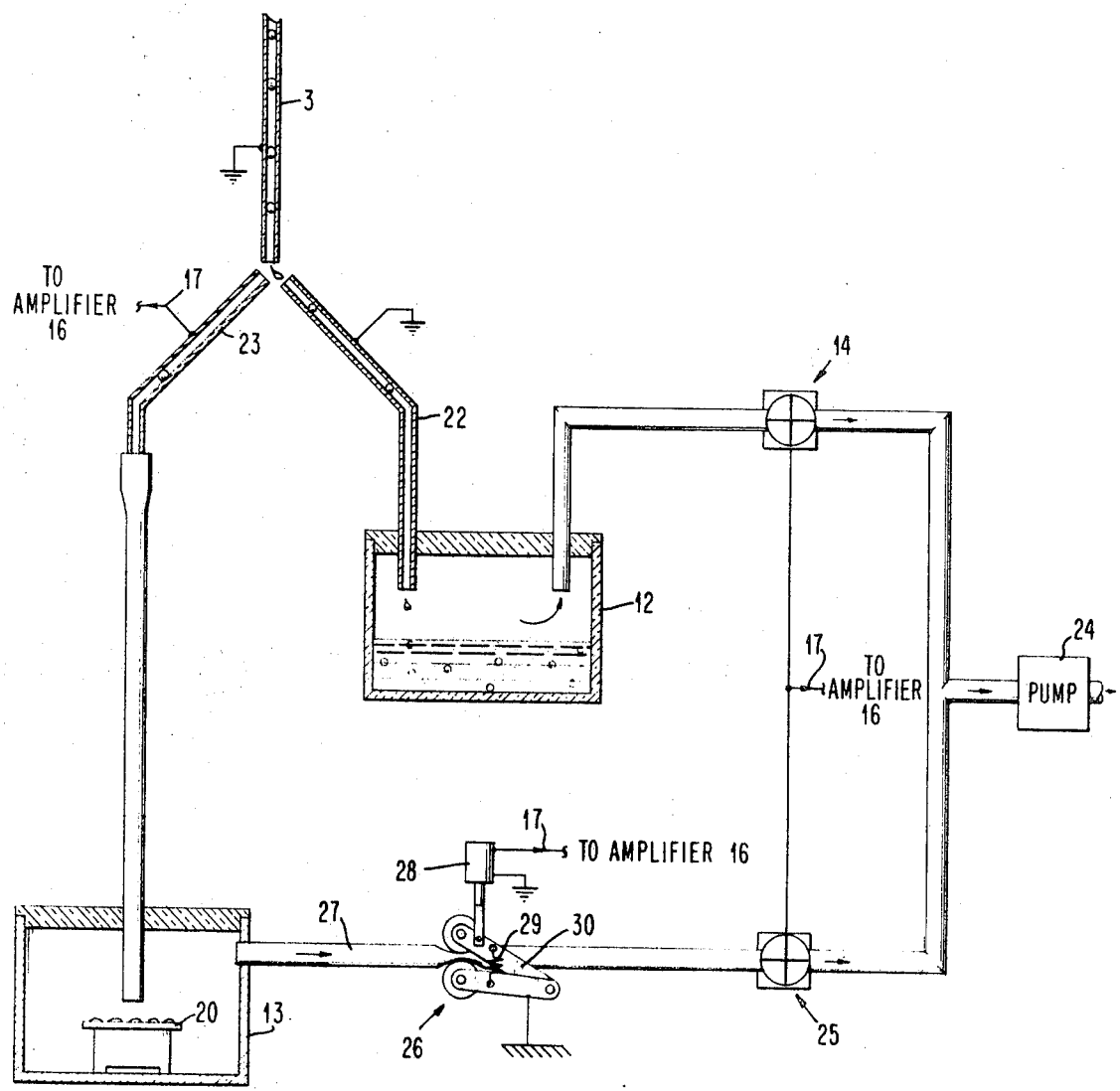
FIG. 2 shows schematically a combination electrostatic-pneumatic cell separating arrangement which can be adapted to permit operation on a pneumatic basis alone.

Referring now to FIG. 2, there is shown cell separation apparatus which is capable of three modes of operation. One mode of operation utilizes the generation of an electrostatic force to cause the deflection of a droplet containing a desired particle or cell from one collection tube to another. In another mode of operation, the suction on one collection tube is suddenly increased to unbalance the condition whereby the normally applied suction causes the cells to enter one channel. The increased suction causes the cells to enter another channel. In a third mode of operation, suction is simply switched from one collection tube to another by the actuation of valves.

In the following description, the same reference numbers will be used for the same apparatus in FIG. 2 as were used in conjunction with FIG. 1.

In FIG. 2, capillary tube 3 is shown as an open ended tube carrying particles or cells. Two steel tubes 22, 23 are shown in close, spaced relationship to tube 3. Tubes 22, 23 are slightly offset from the centerline of capillary tube 3 and the former is spaced from tube 3 in such a way that under normal circumstance cells pass into tube 22 by virtue of suction applied from pump 24 through valve 14 which is normally open. The spacing, of course, can be varied depending on the amount of suction applied by pump 24. Tube 23 is adapted to collect desired cells which have been previously sensed by a sensing means 4 (not shown in FIG. 2) and described in connection with FIG. 1. Tube 23, normally has suction applied to it through normally open valve 25 but of insufficient force to have any effect on the cells passing into tube 22. The suction on tube 23 may be applied from pump 24 and reduced in strength by an actuable pinch roller shown schematically at 26 which constricts flexible tubing 27 to reduce the suction at tube 23. Pinch roller 26 is normally closed to reduce the air flow and may be opened by a solenoid 28 or the like by a pulse from amplifier 16 which actuates armature 29 against spring 30. The actuation of pinch roller 26 will be discussed hereinafter in connection with another solely pneumatic approach to separating particles. For the present, it should be assumed that pinch rollers 26 merely reduce the suction at tube 23. When a desired cell has been sensed, after an appropriate delay, amplifier 16 provides a pulse of from 600 to 1,000 volts. This pulse is applied directly to steel tube 23 over conductor 17. The electrostatic field generated by the pulse, in conjunction with the normally applied suction is sufficient to overcome the suction applied to tube 22 and the desired cell passes to container 13 where it is collected on slide 20. The carrier fluid for the cells is electrolytic in nature and is at ground potential with respect to the pulse applied to tube 23.

It is interesting to note that the suction applied at tube 22 is a necessary feature in the operation of the embodiments shown in FIG. 2. If the carrier fluid containing the cells were merely ejected from capillary tube 3, very large droplets would be formed because of surface tension considerations, which in view of the close spacing of the tubes 22, 23, relative to tube 3, would encompass the tips of these tubes rendering the selection of a droplet containing a cell impossible. This, in addition to causing droplets containing cells to pass to tube 22, the suction provided causes droplets of extremely small size to be formed thereby making the operation of the system possible. In using the electrostatic force to deflect a droplet, care should be taken that voltages are not used which will cause a corona discharge at the tip of tube 23. The tubing leading from tube 23 should, of course, be of insulating material such as Teflon.

Using the arrangement of FIG. 2, an alternative approach can be made which does not incorporate the use of electrostatic deflection. By simply removing lead 17 from tube 23 and attaching it to solenoid 28, pinch roller 26 can be actuated by a pulse from amplifier 16 causing a sudden increase in suction which will overcome the normally applied suction at tube 22. Thus, droplets containing a desired cell may be deflected into tube 23 by solely pneumatic means.

In an arrangement similar to that shown in FIG. 1, conductor 17 may be applied in parallel in FIG. 2, to valves 14 and 25. Valve 25 in this instance, should be a normally closed valve similar to valve 15 in FIG. 1. Using the valving arrangement, suction is applied through normally open valve 14 through closed container 12 to tube 22 to form appropriately sized droplets and channel unwanted cells into container 12. When a desired cell is sensed, after an appropriate delay, valves 14, 25 are actuated causing suction to be removed from tube 22 and applied to tube 23. This causes the droplet containing a desired cell to enter tube 23 and be deposited on slide 20 for further experimentation.

With respect to collecting the desired cells on slide 20, it should be appreciated that other collection techniques can be utilized equally well. For example, an enclosed, removable filter arrangement adapted to collect cells and pass the carrier fluid could be attached directly to the lower end of steel tube 23 in FIG. 2 or to the bottom of intersecting tube 11 in FIG. 1. The enclosed filter would then be connected at its output to flexible tubing 27 in FIG. 2 and directly to pump 19 in FIG. 1.

The above embodiments, by separating desired cells from large populations of cells permit speedy diagnosis of abnormalities in one major use and in another major use permit the separation of various classes of cellular bodies to be separated according to type or condition for analytical purposes.

While the invention has been particularly shown and described with reference to preferred embodiments thereof, it will be understood by those skilled in the art that the foregoing and other changes in form and details may be made therein without departing from the spirit and scope of the invention.

I claim:

1. Apparatus for separating discrete microscopic cellular bodies disposed in a liquid medium according to at least a desired characteristic comprising in combination: a source of said discrete cellular bodies disposed in a carrier liquid, means for transporting said discrete cellular bodies seriatim along a given path under pressure, means disposed in juxtaposition with said first mentioned means for detecting a desired characteristic of said discrete cellular bodies and means responsive to said detecting means for removing selected portions of said carrier liquid each containing at least a discrete cellular body from said given path.

2. Apparatus according to claim 1 further including a junction which divides said given path into at least two separate channels.

3. Apparatus according to claim 1 further including means for introducing at least a predetermined delay interposed between said detection means and said means for removing selected portions of said carrier liquid from said given path.

4. Apparatus according to claim 1 further including variable delay means interposed between said detection means and said means for removing selected portions of said carrier liquid from said given path.

5. Apparatus according to claim 1 further including means disposed in juxtaposition to said given path for collecting said selected portions of said carrier liquid.

6. Apparatus according to claim 1 further including means for applying a positive pressure to said carrier liquid containing said discrete cellular bodies coupled to said first mentioned means at least another extremity thereof.

7. Apparatus according to claim 6 further including means for applying a pressure less than said positive pressure to said first mentioned means at at least another extremity thereof.

8. Apparatus according to claim 1 wherein said means for transporting includes a capillary tube.

9. Apparatus according to claim 1 wherein said means for transporting include a member having a channel disposed therein of a size insufficient to pass more than one of said discrete bodies at any instant.

10. Apparatus according to claim 1 wherein said means for detecting a desired characteristic includes optical means adapted to provide at least a signal output in response to the absorption characteristic of said discrete bodies at a given wavelength and to the light scattering characteristic of said discrete bodies at wavelengths including said given wavelength.

11. Apparatus according to claim 1 wherein said means responsive to said detection means for removing selected portions of said carrier liquid from said given path includes at least valving means disposed in at least a path apart from and connected to said given path.

12. Apparatus according to claim 1 wherein said means responsive to said detection means for removing selected portions of said carrier fluid from said given path includes valving means disposed in said given path and valving means disposed in at least a path apart from and connected to said given path.

13. Apparatus according to claim 12 further including a source of suction connected to each said valving means.

14. Apparatus according to claim 12 further including means for intermittently actuating said valving means whereby suction is alternately applied to said given path and said path apart from said given path.

15. Apparatus according to claim 14 wherein said means for actuating said valving means includes translating means coupled to said detecting means adapted to provide at least an electrical output and at least an amplifier adapted to provide an augmented output to actuate said valving means.

16. Apparatus according to claim 15 wherein translating means includes a photocell.

17. Apparatus for separating discrete cellular bodies held in a carried liquid comprising in combination: a source of said discrete cellular bodies disposed in a carried liquid, means for detecting at least a desired characteristic of said bodies, a shunting junction, means for presenting said bodies to said detecting means and said shunting junction, and means responsive to said detecting means for applying a force intermittently to said carrier liquid at said junction to cause selected portions of said carrier liquid each containing at least one of said bodies to enter said shunting junction.

18. Apparatus according to claim 17 wherein said means for applying a force to said carrier liquid includes at least a source of suction and actuable means for intermittently applying said source of suction at said junction to shunt selected of said discrete bodies from said junction.

19. Apparatus according to claim 1 wherein said discrete bodies are microscopic in size.